(No Model.) 6 Sheets—Sheet 2.

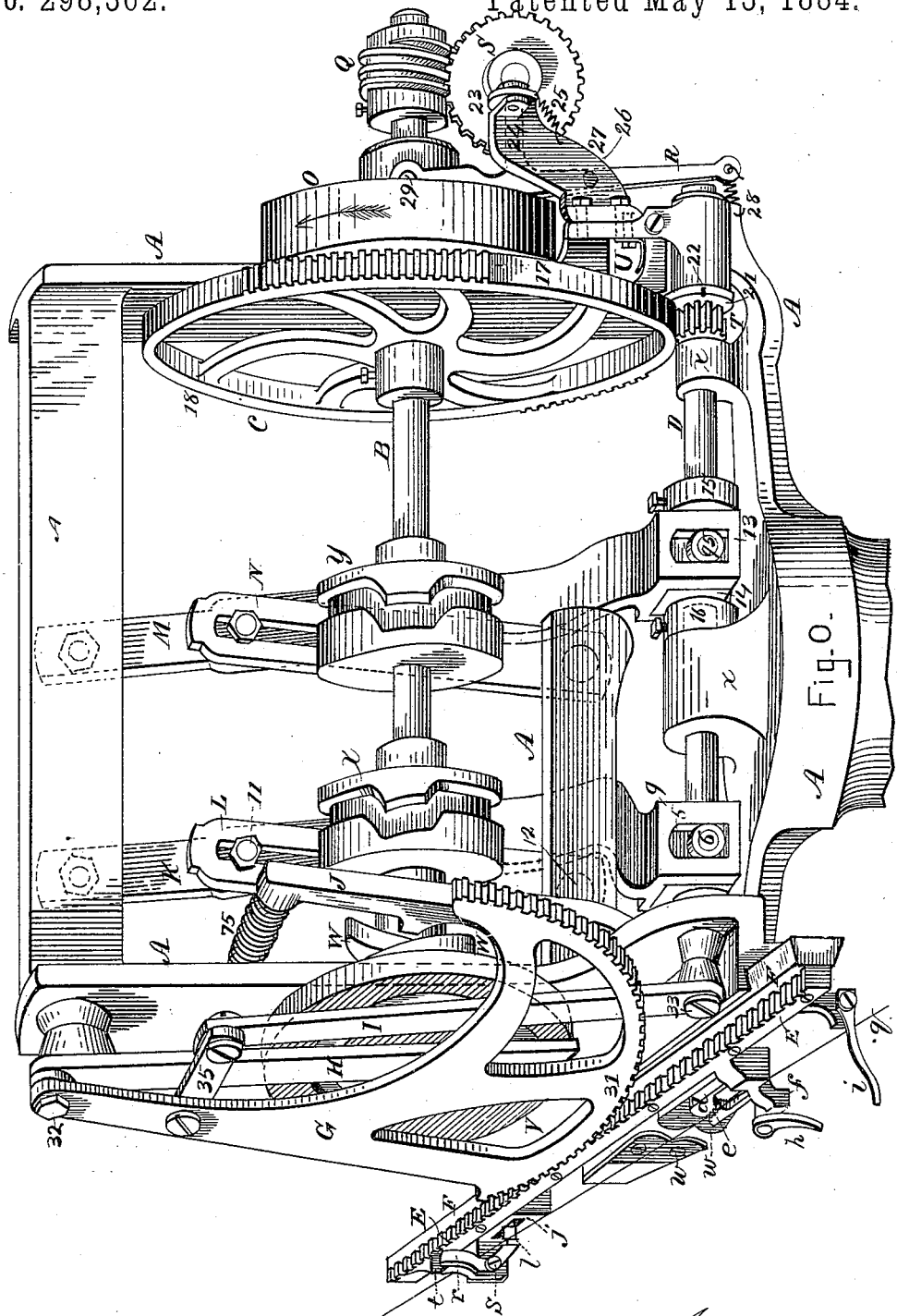

M. V. B. ETHRIDGE.
MACHINE FOR MANUFACTURING BOTTLE WIRES.

No. 298,362. Patented May 13, 1884.

Witnesses:
X. E. Remick,
Alfred Fawcett

Inventor:
Martin V. B. Ethridge,
per C. A. Shaw,
Atty.

(No Model.) 6 Sheets—Sheet 4.

M. V. B. ETHRIDGE.
MACHINE FOR MANUFACTURING BOTTLE WIRES.

No. 298,362. Patented May 13, 1884.

Witnesses:
H. E. Remick
Alfred Fawcett

Inventor:
Martin V. B. Ethridge,
per C. A. Shaw,
Atty.

N. PETERS, Photo-Lithographer, Washington, D. C.

(No Model.) 6 Sheets—Sheet 5.
M. V. B. ETHRIDGE.
MACHINE FOR MANUFACTURING BOTTLE WIRES.
No. 298,362. Patented May 13, 1884.
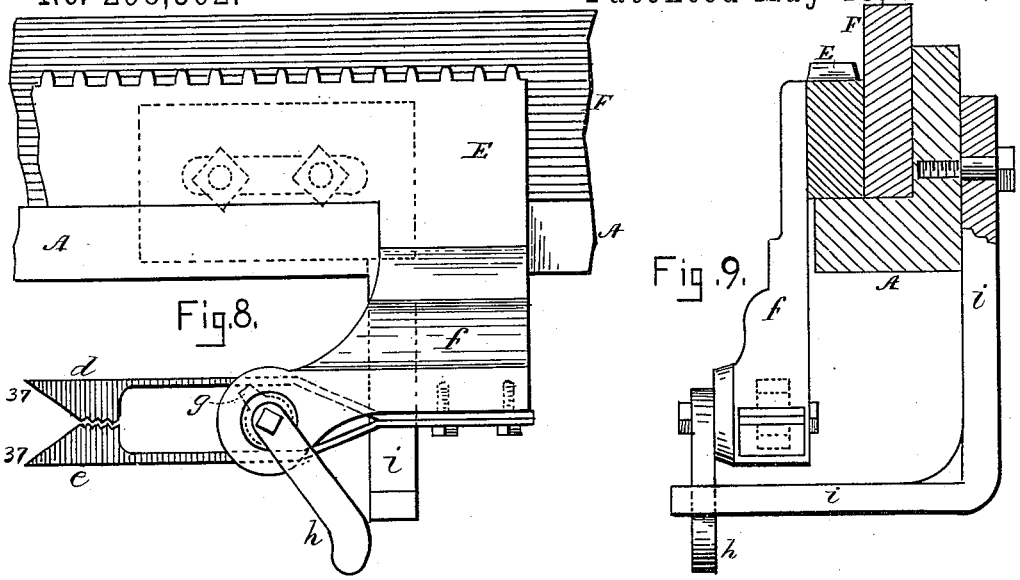
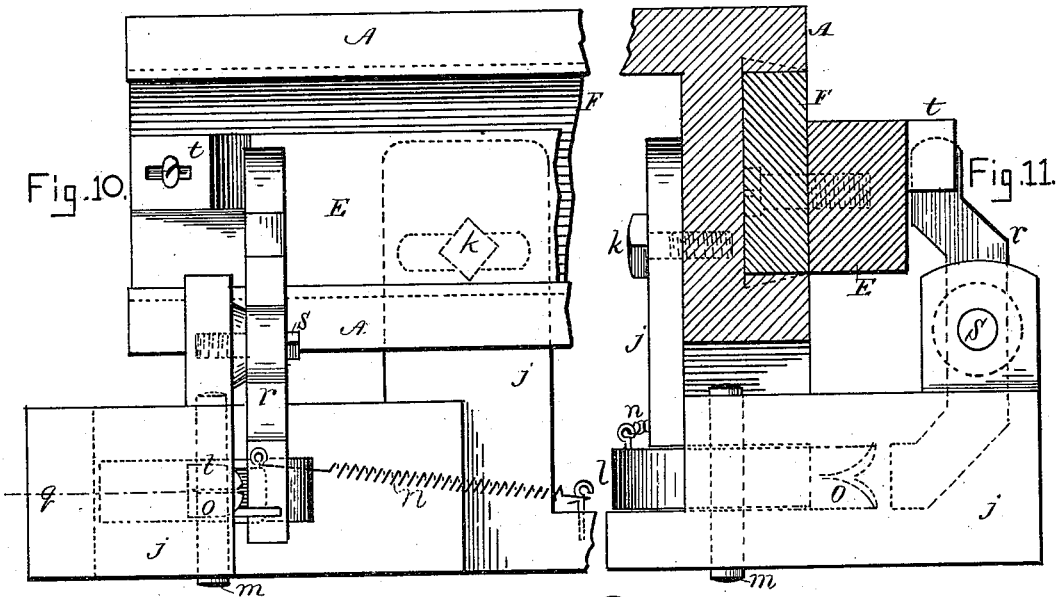
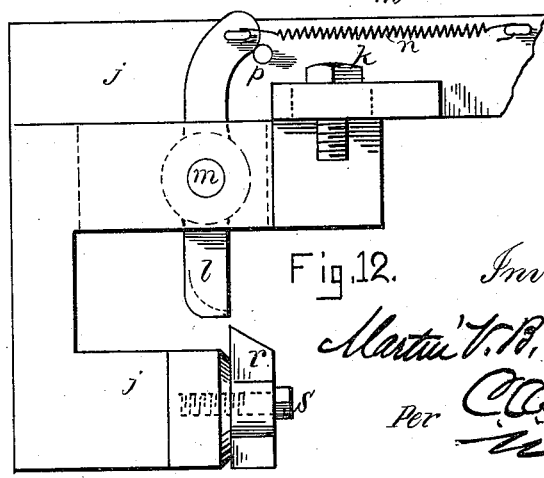
Witnesses:
N. E. Remick
Alfred Fawcett
Inventor:
Martin V. B. Ethridge
Per C. C. Shaw
Atty.

(No Model.) 6 Sheets—Sheet 6.

M. V. B. ETHRIDGE.
MACHINE FOR MANUFACTURING BOTTLE WIRES.

No. 298,362. Patented May 13, 1884.

UNITED STATES PATENT OFFICE.

MARTIN V. B. ETHRIDGE, OF LYNN, MASSACHUSETTS, ASSIGNOR, BY MESNE ASSIGNMENTS, TO JOHN E. WHEELER, TRUSTEE, OF SAME PLACE.

MACHINE FOR MANUFACTURING BOTTLE-WIRES.

SPECIFICATION forming part of Letters Patent No. 298,362, dated May 13, 1884.

Application filed August 17, 1882. Renewed November 6, 1883. (No model.)

*To all whom it may concern:*

Be it known that I, MARTIN V. B. ETHRIDGE, of Lynn, in the county of Essex, State of Massachusetts, have invented a certain new and useful Improvement in Machines for Manufacturing Bottle-Wires, of which the following is a description sufficiently full, clear, and exact to enable any person skilled in the art or science to which said invention appertains to make and use the same, reference being had to the accompanying drawings, forming a part of this specification, in which—

Figure 1:
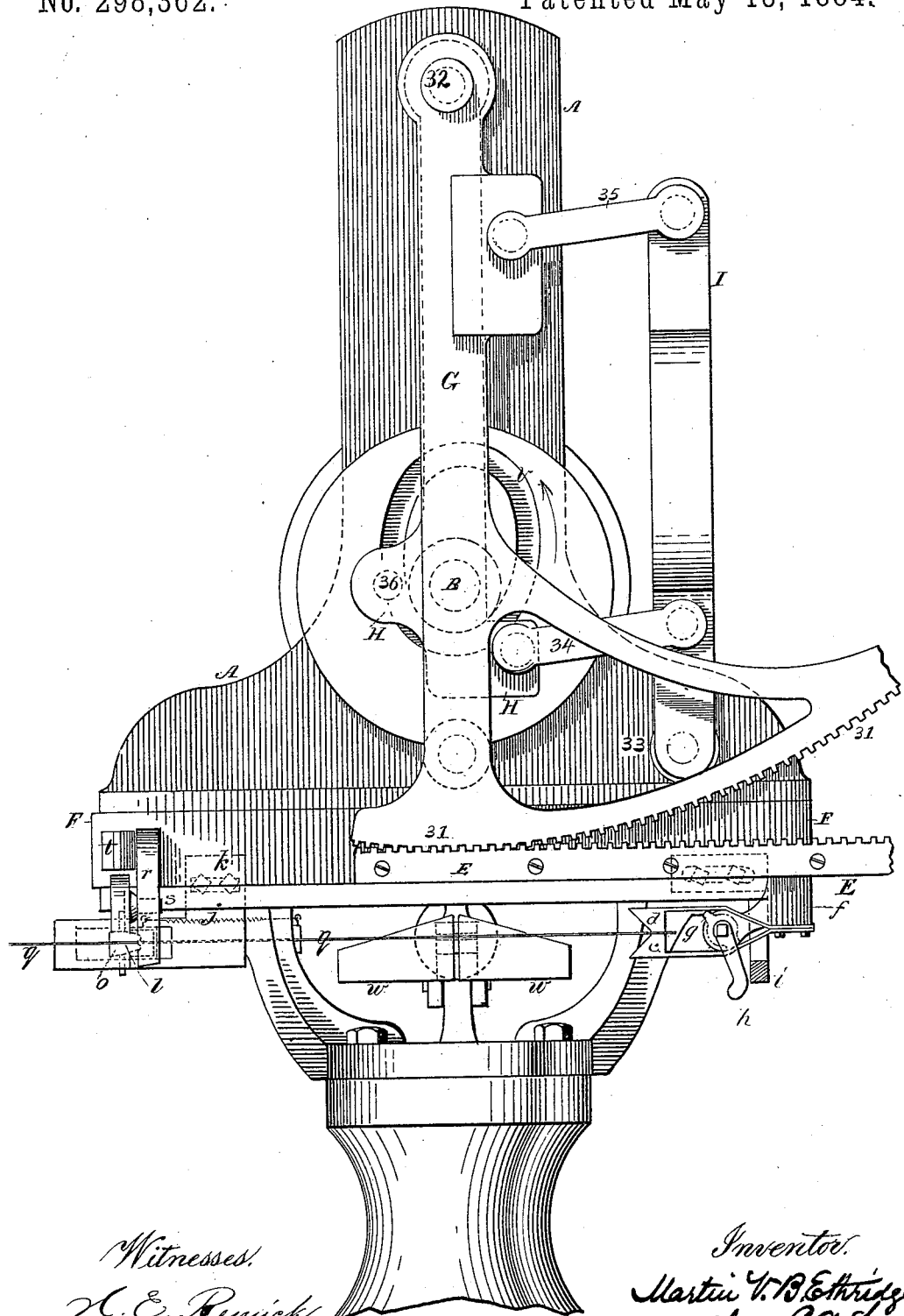
Figure 2:
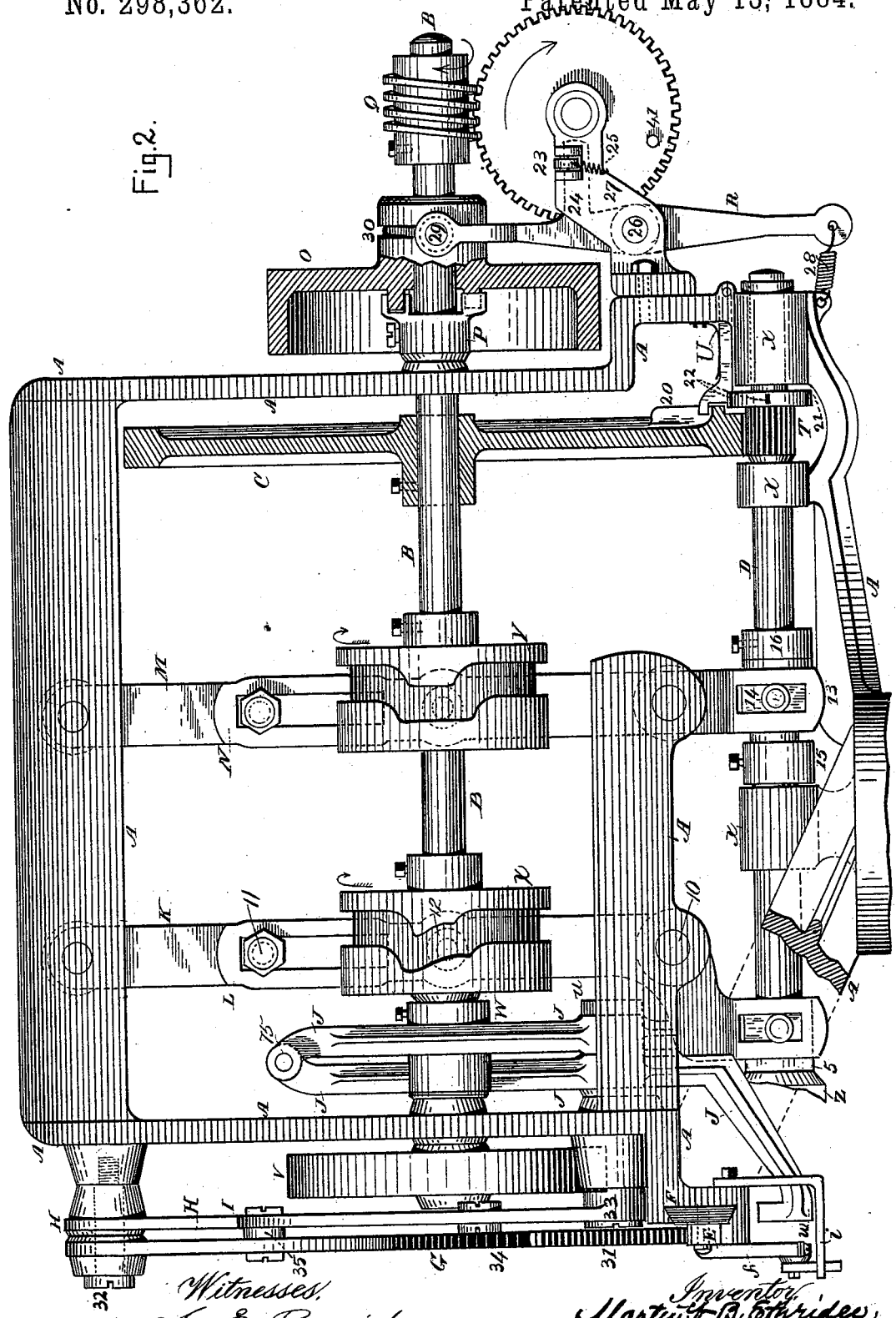
Figure 3:
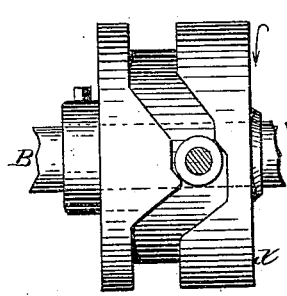
Figure 4:
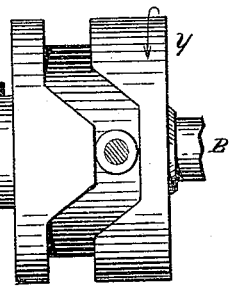
Figure 5:
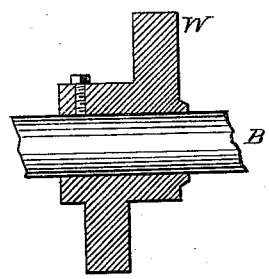
Figure 6:
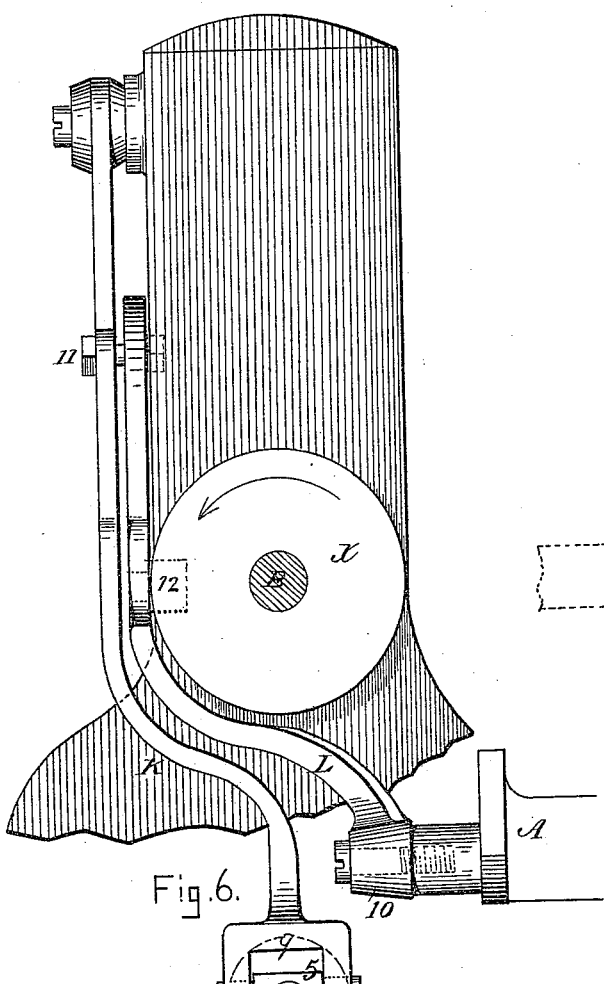
Figure 7:
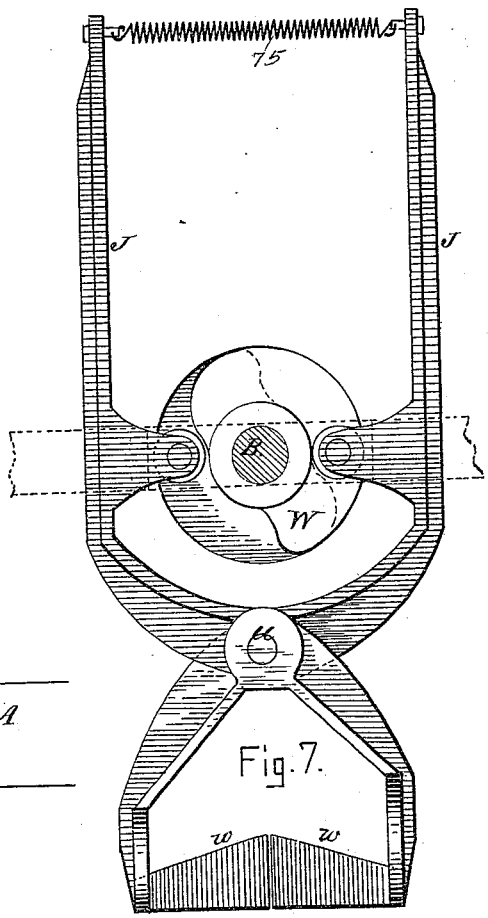
Figure 13:
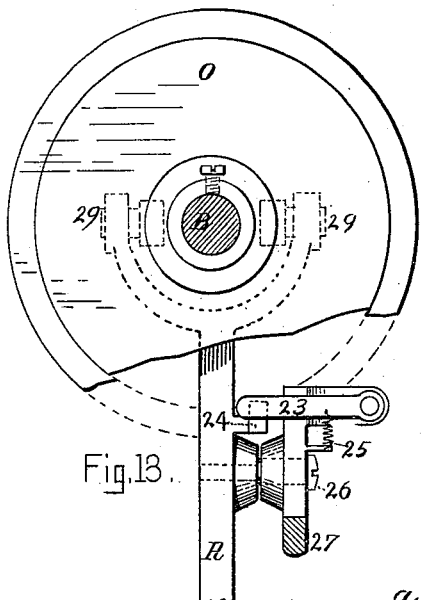
Figure 14:
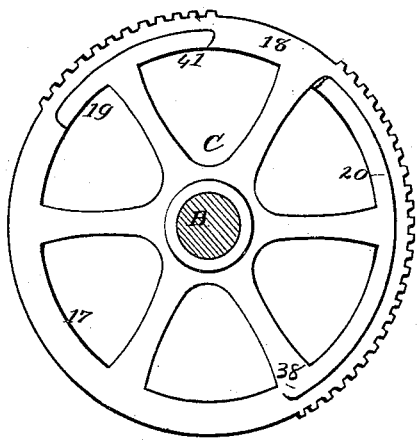
Figures 15, 16:
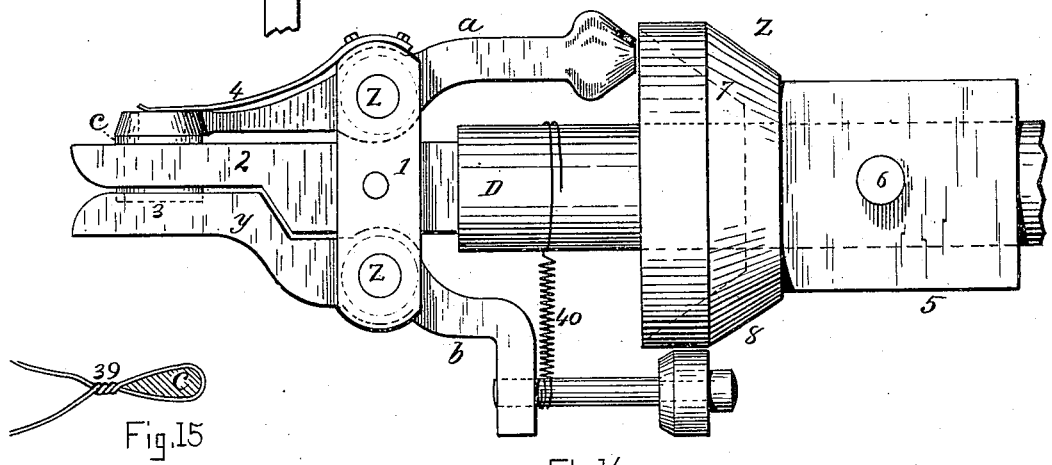
Figure 17:
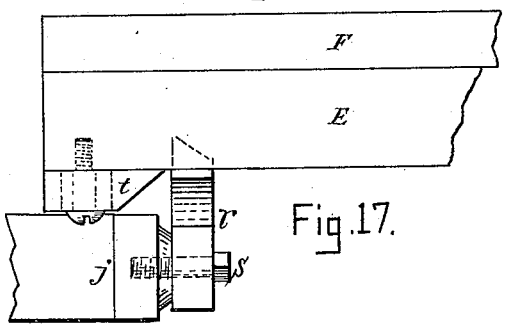

Figure 0 is an isometrical perspective view; Fig. 1, a front elevation; Fig. 2, a side elevation looking from the right of the machine; Figs. 3, 4, views of cams; Fig. 5, a longitudinal section of a cam; Fig. 6, a front view of the levers for closing the twisters shown in Fig. 16; Fig. 7, a front view of the nipper-levers; Fig. 8, an enlarged front view of the spring-nippers shown on the right of the machine in Fig. 1; Fig. 9, a side view of the opening device for the nippers shown in Fig. 8; Fig. 10, an enlarged front view of the guide and cutting-die shown on the left of the machine in Fig. 1; Figs. 11 and 12, respectively, end and plan views of the same; Fig. 13, a rear end view of the register and counting device shown on the right of the machine in Fig. 2; Fig. 14, a view of the main gear-wheel; Fig. 15, a sectional view showing the eye-former and wire as twisted and finished; Fig. 16, a side elevation of the twisting device; and Fig. 17 a sectional plan view of the blade $r$, bracket $j$, rack E, and stop $t$.

Like letters and figures of reference indicate corresponding parts in the different figures of the drawings.

My invention relates to mechanism for manufacturing the wires used for securing the corks of wine, soda, mineral-water, and other bottles; and it consists in a novel construction and arrangement of the parts, as hereinafter more fully set forth and claimed, by which a new and more effective machine for this purpose is produced than is now in ordinary use.

In the drawings, A represents the frame of the machine; B, the main shaft; C, the main gear; D, the nipper or twisting shaft; E, the rack; F, the slide; G H, the pendulous feed-levers; I, the auxiliary or speed lever; J, the nipper-levers; K L, the levers for closing the twisters; M N, the levers for moving the nipper-shaft and opening the nippers; O, the main driving-pulley; P, the clutch-collet; Q, the worm-gear; R, the stop-lever; S, the register-gear; T, the nipper-shaft pinion; U, the latch; V, the face-cam for operating the lever H; W, the cam for operating the nipper-levers J; X, the cam for operating the levers K L; Y, the cam for operating the levers M N, and Z the cam for operating the twister-jaws $a\ b$.

The machine, considered as a whole, embodies the following distinct or specific instrumentalities, to wit: first, a feeding device; second, a cutting device; third, a clamping or holding device; fourth, a twisting device; and, fifth, a registering or counting device, all connected by proper operative devices, and so combined and arranged as to form an organized mechanism for the purpose stated, the registering device being omitted, if desired.

The main shaft B, carrying the cams V W X Y, gears C Q, and pulley O, is journaled horizontally in the center of the frame A, and beneath it, journaled in parallelism therewith, is the nipper-shaft D, carrying the pinion T and cam Z, these parts constituting the principal elements of the actuating mechanism.

The feeding device proper consists of the spring jaws or nippers $d\ e$, which are secured to the arm $f$, projecting downwardly from the rack E. These jaws are opened by the pivoted double cam $g$ and lever $h$ as the lever comes in contact with the stop $i$ on the main frame A.

The cutting device proper is mounted on the arm $j$, which is bolted to the main frame A at $k$, and consists of a lever, $l$, which is pivoted at $m$ to and passes through a slot in the arm $j$, and is provided with the coiled spring $n$, acting contractively to keep its inner end against the stop $p$, the outer or free end of the lever being bifurcated or slotted, as shown at $o$, to form a guide for receiving the wire $q$. The guide also forms one blade or shear of the cutter, the other blade, $r$, being pivoted at $s$ to the arm $j$, and operated by the fixed wedge or cam $t$ on the slide F.

The clamping device proper consists of the nipper-levers J J, provided with the spring 75, for closing the same, and pivoted at $u$ to the main frame A, their free ends projecting under the front portion of the frame, as seen at $w$ in Fig. 2.

The twisting device proper consists, mainly, of the shaft D, which is fitted to slide in the bearings $x\ x$ on the frame A, and carries the twister jaws or arms $a\ b$, which are pivoted at $z$ to the plates 1. The shaft is flattened at its outer end, and shaped as seen at 2 in Fig. 16, the jaw $a$ being provided with the oval-shaped adjustable former $c$, which passes through an aperture in the outer end of the shaft and into a socket, 3, formed in the jaw $b$, the former being held in this socket by the spring 4.

Mounted on the shaft D there is a sleeve, 5, provided with laterally-projecting studs 6, and having its outer end, Z, enlarged and concaved, as seen in Fig. 16, to receive the inner end of the twister-jaw $a$. The jaw $b$ is somewhat longer than the jaw $a$, and its inner end is provided with a friction-roller, which works on the periphery of the enlarged portion of the sleeve 5, which is inclined or beveled at 8 to correspond with the concave 7. The body of the sleeve 5 is square, and fits the fork 9 on the lower end of the lever K, by which it is moved back and forth on the shaft D. Motion is imparted to the lever K by the cam X through the stud 12 and lever L, which lever is pivoted at its lower end, 10, to the frame A, and is connected to the lever K by the stud 11. This stud is made vertically adjustable in the lever for the purpose of regulating the movements of the sleeve 5.

The shaft D is fitted to slide in the bearings $x\ x$, and is moved back and forth therein by means of the levers M N, which are actuated by the cam Y, and arranged in respect to each other like the levers K L. The lever M is provided at its lower end with a fork, 13, which is fitted to a sleeve, 14, the sleeve having at either side fixed collets 15 and 16, which prevent it from sliding on the shaft, and being provided with studs 95. The main gear C intermeshes with the pinion T, a spline (not shown) on the shaft D permitting the pinion to slide without revolving thereon as the shaft is moved back and forth by the lever M. The gear is not toothed around its entire periphery, but is provided with blanks 17 and 18, and also with side cams or laterally-projecting curved segmental fins, 19 and 20, arranged opposite the teeth. The pinion T is provided with a disk or locking-wheel, 21, firmly attached thereto, and having notches 22, into which the latch U falls, to prevent the shaft D from rotating while being moved longitudinally. The blanks 17 and 18 in the gear C are so arranged thereon that when the pinion is locked by the latch U, as described, the teeth of the gear will not engage the pinion T, the fins 19 and 20 raising the latch and holding it suspended, while the teeth of the gear engage the pinion and revolve the shaft D.

The registering device proper consists of the worm-gears Q S, pulley O, lever R, clutch P, and latch 23. The lever R is pivoted at 26 to an arm, 27, on the frame A, and is provided with a laterally-projecting arm, 24, having a notch into which the latch falls and is held by the spring 25. It is also provided at its lower end with a spring, 28, which acts contractively, and at its upper end there is a stud, 29, which works in an annular groove, 30, cut in the hub of the pulley O.

The feeding mechanism is actuated by the cam V, through the pendulous levers G H and auxiliary or speed lever I, the lever G being provided with a toothed segment, 31, which intersects with the rack E, both levers being pivoted or suspended to the frame A by the stud 32. The lower end of the lever I is pivoted to the frame A at 33, and its upper end connected by the link 35 to the upper section of the lever G. The lever H is also connected at its lower end by the link 34 to the lever I, and is provided with a stud, 36, which works in the groove of the cam V.

The cam W actuates the clamping device, and the cams X Y the twisting device. It will be understood that all of the cams are so formed and "timed" in relation to the gear C, pinion T, and latch U as to cause the various devices to which they apply to work in unison, and perform their respective functions properly.

In the use of my machine, the wire is first taken from a coil mounted on a reel (not shown) and inserted in the guide $o$. The blank 17 of the gear C being opposite the pinion T, power is then applied to the pulley O, causing the shaft B and cam V to revolve in the direction shown by the arrow, and through the segment 31 and rack E the spring feed-jaws $d\ e$ to advance to the lever $l$. The ends of these jaws are beveled or inclined, as shown at 37, and when they strike said lever the jaws are opened, and, continuing to advance, pass the lever and shut upon or grasp the wire on the opposite side thereof. The cam V now reverses the movements of the rack E, and the jaws $d\ e$, grasping and carrying the wire $q$, begin their return toward the right of the machine, the spring $n$ yielding to permit the lever $l$, to disenage itself from the jaws as they retreat. As the jaws $d\ e$ return with the wire $q$ in performing the feed, and when they have passed the ends $w\ w$ of the levers J J, these levers are opened by the cam W, to permit the twister-jaws $a\ b$ to advance and grasp the wire. The cam Y now acts upon the levers M N, causing the end of the shaft D carrying the open jaws $a\ b$ to pass between the ends $w\ w$ of the levers J J and receive the wire. When the jaws have sufficiently advanced to take the wire, the cam X, acting on the levers K L, moves the sleeve 5 toward the bearing $x$, freeing the inner end of the lever $a$ from the cam Z, and causing the inner end of the lever $b$ to ride up the incline 8, thus closing the jaws, the former c being then outside of the wire q. The feed-jaws d e having now nearly returned to their original position, the lever h strikes the stop i, causing the cam g to open the same and release the wire. At the same time the wedge t on the slide F strikes the end of the cutting-lever r, causing the cutter to advance, and, in conjunction with the lever l, cut off the wire at the guide o. The section of wire thus cut from the main coil being now held in the twister-jaws a b, the cam Y, acting through the levers M N, causes the shaft D to move in the direction of the pinion T, thus, in conjunction with the ends w w, bending or doubling the wire around the former c. As the wire is drawn through the ends w w, when the jaws a b have advanced far enough to be clear of said ends, and leave a sufficient space for the twist, they stop, and the cam W, acting on the levers J J, closes the ends w w, causing them to clamp the loose ends of the wire and hold them firmly. The latch U is now lifted by the forward end, 38, of the fin 20, the teeth opposite said fin at the same time intermeshing with the pinion T, causing the shaft D to revolve three or more times and form the twist 39, as shown in Fig. 15, leaving the jaws a b standing in such a position that the twisted wire will drop freely from them when released by the clamp w w. The gear C, having revolved until the teeth opposite the fin 20 leave the pinion T, and bring the space 18 opposite the same, the cam W now acts upon the levers J J to open the clamp w w, and the cam Y upon the levers M N to move the shaft D in the direction of the pinion, bringing the inner end of the twister-jaw a against the incline 7 of the cam Z, and permitting the inner end of the jaw b to slide down the incline 8, being kept in contact therewith by the spring 40, thus simultaneously opening the twister-jaws and clamp, and dropping the finished or twisted wire, bent as shown in Fig. 15, into any convenient receptacle. After the blank 18 on the gear C has passed the pinion T, the end 41 of the fin 19 raises the latch U, and at the same time the teeth opposite said fin intermesh with the pinion and cause the shaft D to make a quarter turn or revolution, bringing the jaws a b into proper position to be again advanced and grasp the wire, as before described.

In the operation of the registering device, when the gear Q on the main shaft B has made one hundred revolutions and the gear S one revolution, the stud or dog 41 on the side of the gear S raises the latch 23 from its notch in the arm 24, permitting the spring 28, acting through the lever R, to uncouple the pulley O and clutch P, and thus stop the machine, indicating that one hundred wires have been manufactured.

It will be obvious that the registering mechanism may be so constructed as to stop the machine when it has cut any given number of wires.

Having thus explained my improvement, what I claim is—

1. In a machine for manufacturing bottle-wires, the improved feeding device described, consisting of the spring jaws or nippers d e, cam g, and lever h, in combination with the slide F, and stop i, and operative mechanism, substantially as specified.

2. In a machine for manufacturing bottle-wires, the improved twisting device described, consisting of the shaft D, twister-jaws a b, former c, sleeve 5, levers K L, cam X, levers M N, cam Y, sleeve 14, gear C, pinion T, and latch U, in combination with the clamping-levers J J, having jaws w w and operative mechanism, substantially as set forth.

3. In a machine for manufacturing bottle-wires, the improved registering mechanism described, consisting of the gears Q S, pin 41, lever R, latch 23, and spring 28, in combination with the pulley O, clutch P, and operative mechanism, substantially as set forth.

4. The combination of a feeding device consisting of the spring-jaws d e, double cam g, lever h, and stop i, a cutting device consisting of lever l, bifurcated or slotted at one end, contractile spring n, stop p, blade r, cam t, and slide F, a clamping device consisting of nipper-levers J J, provided with spring 75, a twisting device consisting of sliding shaft D, carrying pivoted twister-jaws a b, and former c, and suitable actuating mechanism, substantially as described.

MARTIN V. B. ETHRIDGE.

Witnesses:
C. A. SHAW,
ALFRED FAWCETT.